United States Patent [19]

Katada et al.

[11] Patent Number: 5,028,202
[45] Date of Patent: Jul. 2, 1991

[54] GLASS PLATES POSITIONING DEVICE

[75] Inventors: Yoshiki Katada, Matsusaka; Masami Nishitani, Mie, both of Japan

[73] Assignee: Central Glass Company, Limited, Ube, Japan

[21] Appl. No.: 560,819

[22] Filed: Jul. 31, 1990

[30] Foreign Application Priority Data

Jul. 31, 1989 [JP] Japan .............................. 1-89978[U]

[51] Int. Cl.⁵ .............................................. B65G 47/26
[52] U.S. Cl. ................................... 414/783; 414/781; 65/289; 65/148; 198/470.1; 198/434; 271/238
[58] Field of Search ...................... 414/783, 781, 788; 198/345.1, 346.2, 434, 470.1; 65/286, 163, 289, 245, 148; 156/379.8, 538, 539, 543, 554, 556, 566; 51/277; 271/226, 234, 236, 238, 240

[56] References Cited

U.S. PATENT DOCUMENTS

| | | | |
|---|---|---|---|
| 3,992,182 | 11/1976 | Frank | 198/434 X |
| 4,064,659 | 12/1977 | Ulivi | 198/345.1 X |
| 4,204,853 | 5/1980 | Seymour | 65/289 X |
| 4,347,927 | 9/1982 | Landes | 198/434 |
| 4,420,361 | 12/1983 | Valimont et al. | 414/788 X |
| 4,452,351 | 6/1984 | Meeker | 198/434 |
| 4,685,418 | 8/1987 | Morse | 156/556 X |
| 4,708,759 | 11/1987 | Porat | 156/538 X |
| 4,976,766 | 12/1990 | Kuster et al. | 198/434 X |
| 4,979,974 | 12/1990 | Mathivat et al. | 65/289 X |

FOREIGN PATENT DOCUMENTS 54-21846 8/1979 Japan .

Primary Examiner—F. J. Bartuska
Assistant Examiner—Brian K. Dinicola
Attorney, Agent, or Firm—Fleit, Jacobson, Cohn, Price, Holman & Stern

[57] ABSTRACT

A glass plates positioning device for positioning overlapped larger and smaller glass plates on a belt conveyer is disclosed, which includes a light device and pushing portions. The lift device lifts up the glass plates from the belt conveyer and lowers the same onto the belt conveyer. In a lifted position, the glass plates are horizontally universally movably supported by the lift device and positioned by the pushing portions. Each pushing portion is shaped like a spinning top, which includes concentrically connected smaller and larger disc portions. Each pushing portion horizontally abuts against and pushes each side edge of the glass plates to a predetermined position, wherein side surface of the larger disc is in contact with the edge of the smaller glass plate and the side surface of the smaller disc is in contact with the edge of the larger glass plate. After the positioning of the glass plates, the glass plates are lowered onto the belt conveyer by the lift device. Thus, the glass plates can be precisely positioned on the belt conveyer.

12 Claims, 3 Drawing Sheets

GLASS PLATES POSITIONING DEVICE

BACKGROUND OF THE INVENTION

1. Field of the Invention

The present invention relates in general to a glass plates positioning device for use in a laminated glass manufacturing line, and more particularly, to a positioning device for positioning two overlapped glass plates of different sizes, which are used for producing a warped laminated glass, such as a vehicular windshield or the like.

2. Description of the Prior Art

The laminated glass widely used as a safety glass comprises two sheets of plate glass with an interposal of a sheet of transparent resinoid, viz., interlayer which is glued to the two glass plates.

In manufacturing the laminated glass, two flat glass plates and a sheet of resinoid are preliminarily assembled as a sandwich, and the flat laminate is then led into a furnace to unite. During the heating, a suitable pressure is applied to the laminate to warp or curve the same. In order to allow the finished laminated glass, which is thus warped, to have a substantially matched edge, the two flat glass plates have different sizes. That is, the glass plate for the outer layer of the warped laminated glass is larger than the glass plate for the inner layer. Thus, before subjecting to the warping process, the two overlapped glass plates are compelled to have a continuous gap about the peripheries thereof. That is, as is understood from FIGS. 4 and 5, the overlapping is so made that the smaller glass plate is placed over the larger glass plate having the periphery thereof located somewhat inside of the periphery of the larger glass plate.

In order to achieve positioning of the overlapped glass plates before the warping process, one positioning device has been proposed, which is shown in Japanese Patent Second Provisional Publication No. 54-21846.

The positioning device of this publication comprises cylindrical pushing rollers, each being arranged vertically. In operation, the rollers are biased to abut, with their cylindrical side surfaces, against four sides of the overlapped glass plates which are conveyed to a furnace by a belt conveyor.

However, due to its inherent construction, the positioning device of the publication can position only a larger glass plate. In fact, the positioning device can not position a smaller glass plate placed on the larger glass plate, because the cylindrical outer surfaces of the pushing rollers do not reach the sides of the smaller glass plate. When the overlapped glass plates are subjected to the warping process with the smaller glass plate poorly positioned, they tend to break or have undesirable bubbles in the interposed resinoid sheet when they are temporarily pressed by tacking rolls and/or fully pressed in an autoclave.

SUMMARY OF THE INVENTION

It is therefore an object of the present invention to provide a glass plates positioning device to precisely position both two glass plates of different sizes on a belt conveyor, which is free of the above-mentioned drawbacks.

According to the present invention, there is provided a glass plates positioning device for positioning overlapped larger and smaller glass plates, which comprises supporting means for horizontally universally movably supporting the overlapped glass plates, and pushing means to push and position the glass plates, the pushing means including pushing portions each including larger and smaller disc members which are concentrically connected, the pushing portions being movable to predetermined positions wherein the side surfaces of the larger disc members are in contact with the edges of the smaller glass plate and the side surfaces of the smaller disc members are in contact with the edges of the larger glass plate, and first drive means to horizontally move the pushing portions to the predetermined positions.

BRIEF DESCRIPTION OF THE DRAWINGS

The features and advantages of the glass plates positioning device of the present invention will be more appreciated from the following description when taken in conjunction with the accompanying drawings, in which.

DETAILED DESCRIPTION OF THE INVENTION

Referring to FIGS. 1 to 5, there are shown two overlapped glass plates 10 and 10' of different sizes and a glass plates positioning device. The two glass plates 10 and 10' have a resinoid film interposed therebetween. The device positions the glass plates 10 and 10' on a two line belt conveyer 12. The glass plates 10 and 10' are generally rectangular in shape.

Figure 1:
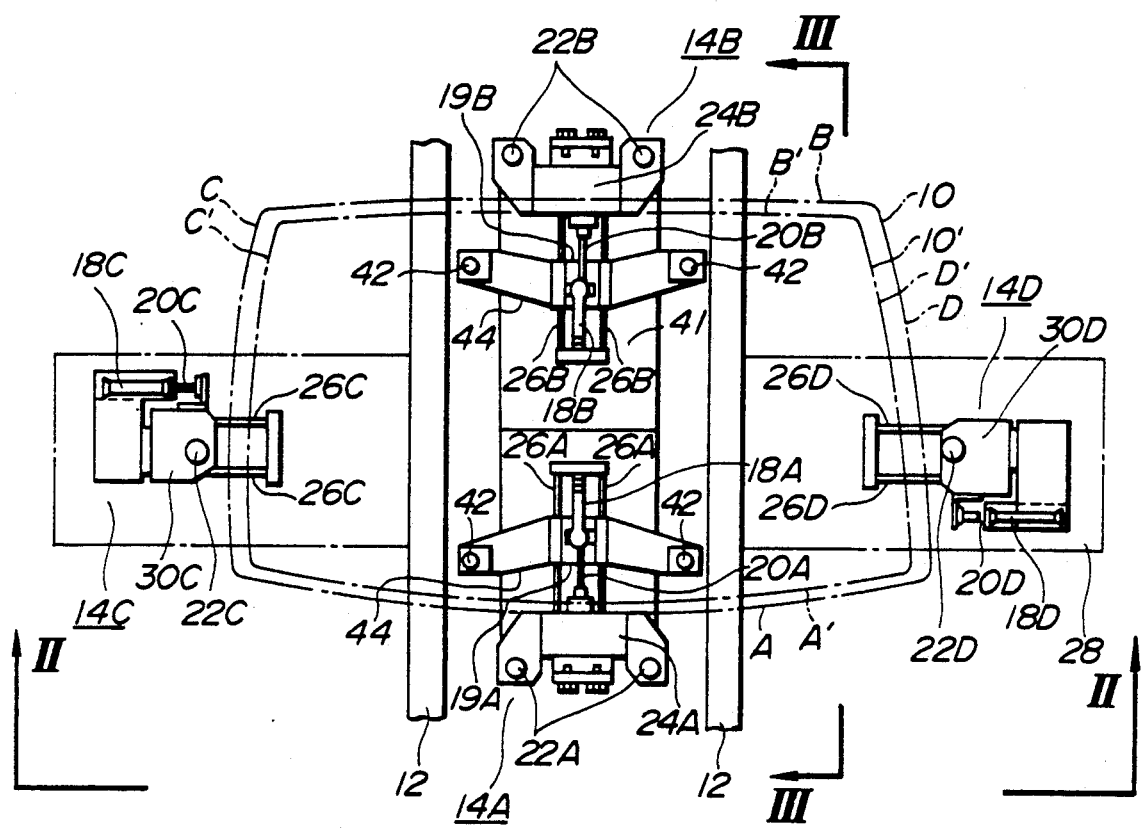
FIG. 1 is a plan view of a glass plates positioning device of the present invention.
Figure 2:
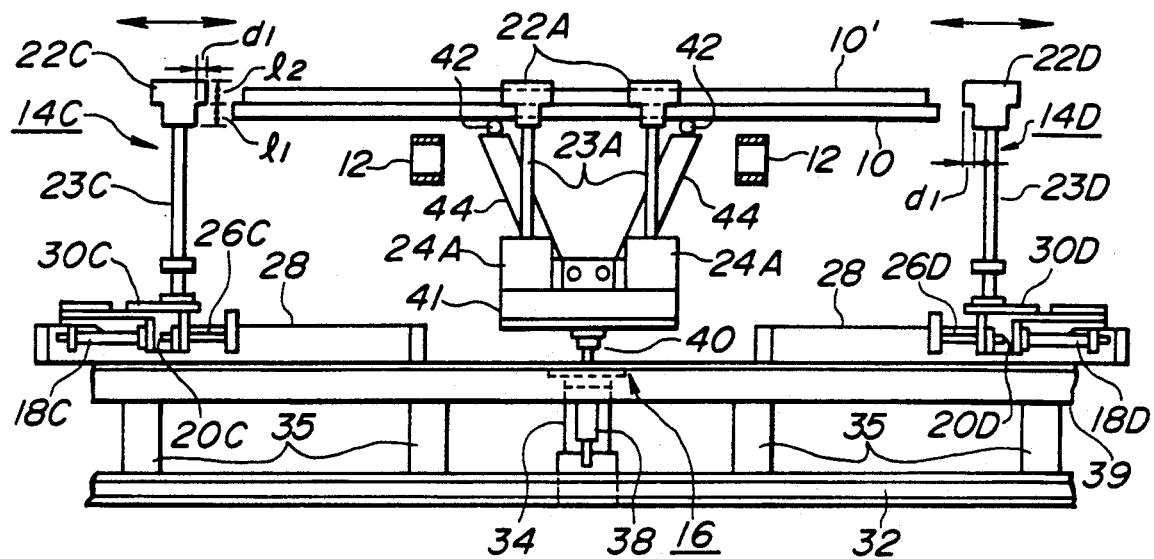
FIG. 2 is a vertical elevation of the positioning device, which is taken along the line II—II of FIG. 1.
Figure 3:
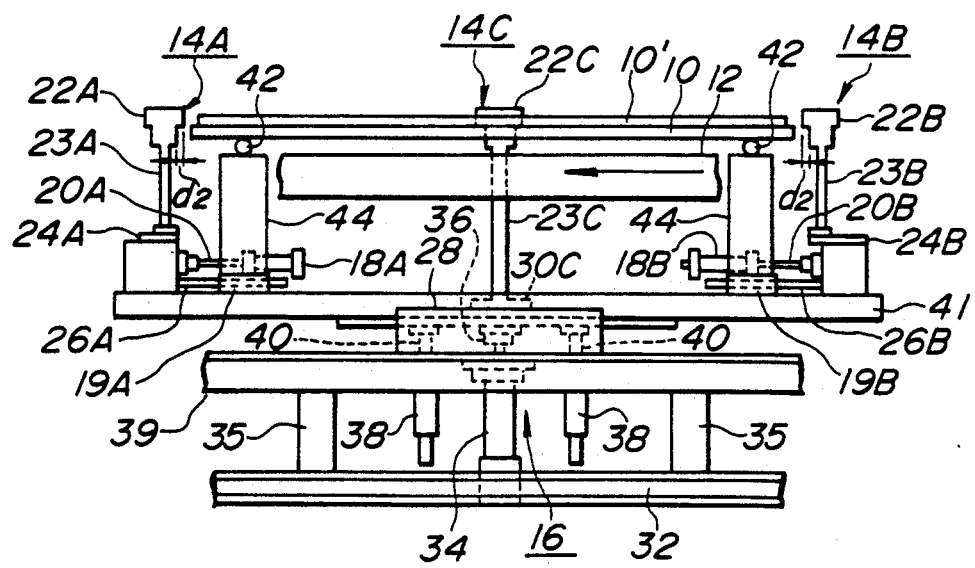
FIG. 3 is another a vertical elevation of the positioning device, which is taken from along the line III—III of FIG. 1.

As shown in FIGS. 1 to 3, the positioning device comprises pushing means 14A, 14B, 14C and 14D for pushing four side surfaces of each of the glass plates 10 and 10', and a lifting mechanism 16 for raising and lowering the glass plates 10 and 10' and the pushing means 14A and 14B.

As is seen from FIGS. 2 and 3, the lifting mechanism 16 comprises a mounting frame 32, an air-cylinder 34, a supporting frame 39, and a mounting plate 41 which is vertically moved by the air-cylinder 34.

The suporting frame 39 is mounted over the mounting frame 32 through a plurality of vertical columns 35.

A working stem 36 (see FIG. 3) is vertically moved by the air-cylinder 34, the working stem 36 being secured at its upper end to the mounting plate 41. Thus, the mounting plate 41 is vertically movable upon operation of the air-cylinder 34. The vertical movement of the mounting plate 41 is guided by two guides 38 which are secured to the supporting frame 39 and rods 40 which slidably pass through the tubular guides 38 and are secured at their upper ends to the mounting plate 41.

As is seen from FIG. 3, each pushing means 14A or 14B mounted on the vertically movable mounting frame 41 comprises an air-cylinder 18A or 18B connected to the mounting frame 41 through a first mount 19A or 19B, a second mount 24A or 24B slidably disposed on the mounting plate 41, parallel guides 26A or 26B secured to the mount 24A or 24B and passing through the mount 19A or 19B and pushing portions 22A or 22B for pushing the edges of the glass plates 10 and 10'.

Each mount 24A or 24B is secured to a working stem 20A or 20B which is horizontally moved by the air-cylinder 18A or 18B. The two pushing portions 22A are connected to the mount 24A or 24B through vertical supporting rods 23A or 23B, respectively. Thus, the pushing portions 22A or 22B are vertically moved together with the mounting plate 41 by the air-cylinder 34 and horizontally moved by the air-cylinders 18A or 18B. As is seen from FIG. 1, the two pushing portions 22A or 22B are positioned on imaginary parallel lines which are perpendicular to the direction in which the belt conveyer 12 runs. The pushing portions 22A or 22B are spaced away from each other in order to precisely position or locate the overlapped glass plates 10 and 10' to predetermined positions.

Two straight supporting bars 44 extend upward from each mount 19A or 19B. Each bar 44 has a universal roller 42 at its upper end to sustain the overlapped glass plates 10 and 10'.

The height of each rod 23A or 23B is adjustable, so that the height of the pushing portions 22A or 22B can be changed to appropriately push the edges of the glass plates 10 and 10'.

As is seen from FIG. 2, the other pushing means 14C and 14D are mounted on two separate mounting plates 28 which are mounted on the frame 39. Each plate 28 is positioned not to interefere with the vertical movement of the lifting mechanism 16. Each pushing means 14C or 14D comprises an air-cylinder 18C or 18D, a working stem 20C or 20D horizontally moved by the air cylinder 18C or 18D, a mount 30C or 30D connected to the woking stem 20C or 20D, a supporting rod 23C and 23D mounted on the mount 30C or 30D, and a pushing portion 22C or 22D secured to the rod 23C or 23D.

Thus, upon operation of the air-cylinder 18C and 18D, the pushing portion 22C and 22D is moved toward or away from the edges of the overlapped glass plates 10 and 10'.

Figure 5:
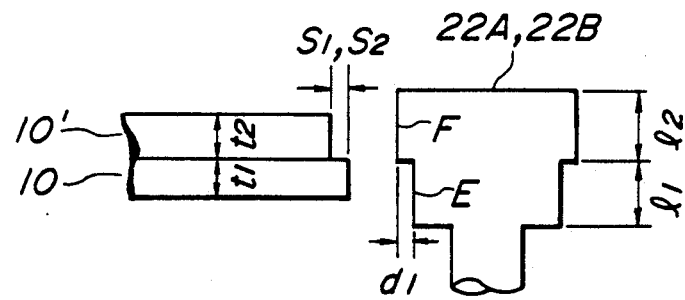
FIG. 5 is a sectional view showing a gapped periphery of the overlapped glass plates and pushing portions.
Figure 5:
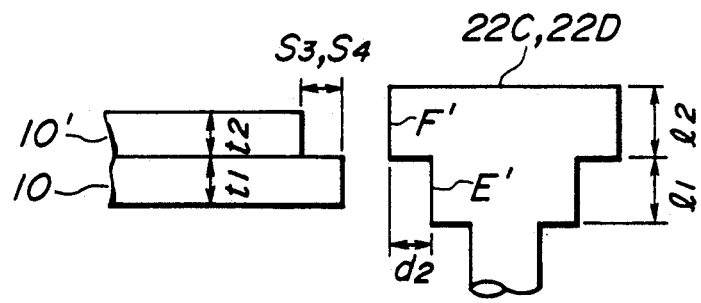

As is seen from FIG. 5, each pushing portion 22A, 22B, 22C or 22D is shaped like a spinning top, which includes concentrically connected smaller and larger disc portions, each having a thickness of "$l_1$" or "$l_2$". An annular step or gap thus defined between the smaller and larger disc portions of the pushing portions 22A and 22B has a width designated by "$d_1$", while the step of the other pushing portions 22C and 22D has a width designated by "$d_2$". If the two glass plates 10 and 10' are square in shape, the widths "$d_1$" and "$d_2$" are made equal. Thus, in this case all of the pushing portions 22A, 2B, 22C and 22D are identical in shape.

Figure 4:
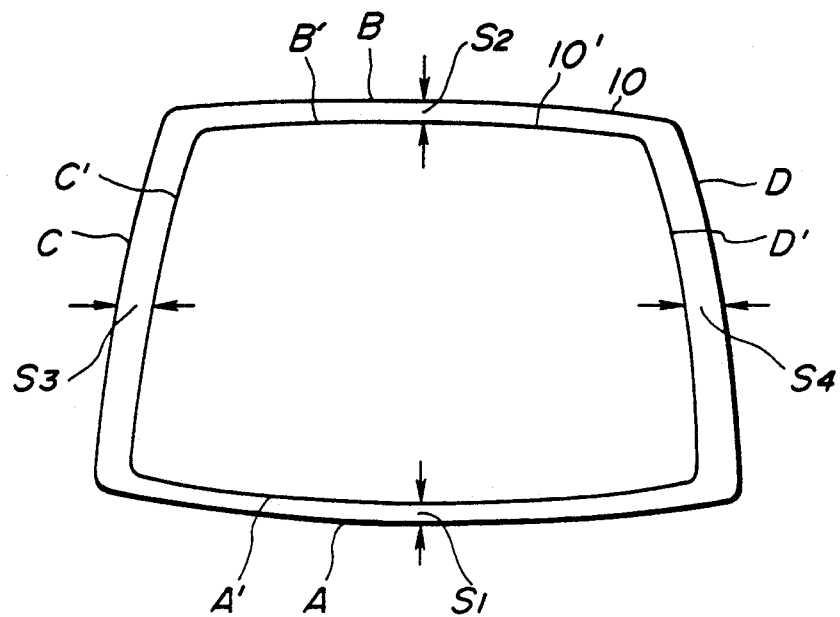
FIG. 4 is a plan view of the two glass plates of different sizes which are to be positioned on a belt conveyer.

In FIG. 4, designated by A and B are major sides of the larger glass plates 10, and by C and D are minor sides of the same. Similarly, designated by A', B', C' and D' are major and minor sides of the smaller glass plates 10'. Designated by $S_1$, $S_2$, $S_3$ and $S_4$ are the distances between A and A', B and B', C and C', and D and D', respectively. In FIG. 5, designated by $t_1$ and $t_2$ are thicknesses of the glass plates 10 and 10', respectively.

The thicknesses $l_1$ and $l_2$ are larger than the thicknesses $t_1$ and $t_2$ to ensure sufficient contact between the sides of the glass plates 10 and 10' and the pushing portions 22A, 22B, 22C and 22D.

Operation will be described in the following. For ease of understanding, the description will be commenced with respect to a rest condition of the positioning device.

Under this rest condition, the air-cylinders 18A, 18B, 18C and 18D and 34 are kept all de-energized. Thus, the universal rollers 42 and the pushing portions 22 A and 22B are positioned below the belt conveyer 12, and the pushing portions 22C and 22D take their outermost inoperative positions.

When the overlapped glass plates 10 and 10' are conveyed by the conveyer 12 to a predetermined position of the positioning device, the conveyer 12 is stopped due to operation of a position sensor (not shown). Upon this, the air-cylinder 34 is energized to lift the mounting plate 41 under a guidance of the guides 38 and the rods 40. When the universal rollers 42 abut against and then lift up the overlapped glass plates 10 and 10' from the stopped conveyer 12 to a predetermined height, energization of the air-cylinder 34 stops. The pushing means 14A and 14B are also lifted together with the mounting plate 41.

Then, the air-cylinders 18A and 18B are energized. With this, the two pairs of pushing portions 22A and 22B are horizontally moved toward each other and abut against the opposed gapped edges of the overlapped glass plates 10 and 10'. During this movement, the cylindrical side surfaces "E" and "F" (see FIG. 5) of each pushing portion 22A abut against and push the side edges sufaces "A" and "A'" of the glass plates 10 and 10' to predetermined positions. Similarly, the cylindrical side sufaces "E" and "F" of the pushing portion 22B abut against and push the side edges "B" and "B'" of the glass plates 10 and 10' to predetermined positions. In the predetermined positions, all the distances "$S_1$", "$S_2$" "$d_1$" become equal.

After the glass plates 10 and 10' are moved to the predetermined positions, the air-cylinders 18A and 18B are de-energized to stop the movement of the pushing portions 22A and 22B.

Then, the air-cylinders 18C and 18D are energized. With this, just like the pushing portions 22A and 22B, the pushing portions 22C and 22D are horizontally moved toward each other until they abut against and push the opposed gapped edges of the overlapped glass plates 10 and 10' to the predetermined positions. In the predetermined positions, all the distances "$S_3$", "$S_4$", "$d_2$" become equal.

After the glass plates 10 and 10' are moved to the predetermined positions, the air-cylinders 18C and 18D are de-energized to stop the movement of the pushing portions 22C and 22D. Thus, all the pushing portions 22A, 22B, 22C and 22D abut against the side edges of the glass plates 10 and 10'.

After getting the aimed positions of the glass plates 10 and 10', the air-cylinders 18A, 18B, 18C and 18D are energized again to return the pushing portions 22A, 22B, 22C and 22D to their original inoperative positions. Thereafter, the cylinder 34 is de-energized to lower the overlapped glass plates 10 and 10', which are thus positioned to each other, onto the conveyer 12. Then, the conveyer 12 is operated to carry the glass plates 10 and 10' to a furnace to heat the same for warping process.

As is described hereinabove, the glass plates 10 and 10' can be precisely positioned on the conveyer. Thus, the glass plates will not be broken or have undesirable bubbles in the interposed resinoid sheet when they are temporarily pressed by tacking rolls and/or fully pressed in an autoclave.

Although, in the embodiment, the pushing portion is described as having the shape of the spinning top including concentrically connected smaller and larger disc portions, the pushing portion can take various shapes depending on the shapes of the edges of the two glass plates. Furthermore, the pushing portion may take shape of a reversed truncated cone if the glass plates are sufficiently suspended by the universal rollers 42.

The air-cylinders 18A, 18B, 18C and 18D can be substituted by hydraulic cylinders or feed screw devices.

What is claimed is:

1. A positioning device for positioning overlapped larger and smaller glass plates, comprising:
   supporting means for elevating and for horizontally universally movably supporting said overlapped glass plates in an elevated position; and
   pushing means to simultaneously push and position said glass plates, said pushing means including:
   pushing portions each including larger and smaller disc members which are concentrically connected, said pushing portions being movable to predetermined positions wherein a peripheral edge surface of said larger disc members are in contact with the edges of said smaller glass plate and a peripheral edge surface of said smaller disc members are in contact with the edges of said larger glass plate; and
   first drive means to horizontally move said pushing portions to said predetermined positions.

2. A positioning device as claimed in claim 1, in which said glass plates are rectangular.

3. A positioning device as claimed in claim 2, in which said pushing means comprise two first pushing means and two second pushing means, said two first pushing means having said glass plates put therebetween, and said two second pushing means having said glass plates put therebetween.

4. A positioning device as claimed in claim 3, further comprising conveying means to convey said glass plates to a place in which said glass plates are to be positioned.

5. A positioning device as claimed in claim 4, further comprising second drive means to vertically move said supporting means and said first pushing means.

6. A positioning device as claimed in claim 5, in which said two first pushing means each comprise two of said pushing portions, said pushing portions of said first pushing means being movable vertically from a first position below said conveying means to a second position above said conveying means.

7. A positioning device as claimed in claim 6, in which said glass plates, due to operation of said second drive means, are vertically movable upward from said conveying means to a position where the edges of said glass plates are engageable with said pushing portions of said second pushing means.

8. A positioning device as claimed in claim 7, in which said second pushing means each comprise one of said pushing portions.

9. A positioning device as claimed in claim 8, in which said first and second drive means are air-cylinders.

10. A positioning deveice as claimed in claimed 9, in which said second pushing means are secured to a fixed member.

11. A positioning device as claimed in claimed 4, in which said conveying means is a two line belt conveyer.

12. In a line including a belt conveyer for carrying overlapped larger and smaller glass plates which put therebetween a resinoid film,
   a glass plate positioning device comprising:
   a lift device for lifting up said overlapped larger and smaller glass plates from said belt conveyer;
   a first pushing means carried by said lift device, said first pushing means including first drive means and at least two pushing portions by which opposed edges of said overlapped larger and smaller glass plates are pushed with an aid of said drive means to achieve positioning of the two glass plates with respect to a first predetermined direction; and
   a second pushing means arranged on a fixed member and including second drive means and at least two pushing portions by which the other opposed edges of said overlapped larger and smaller glass plates are pushed with an aid of said second drive means to achieve positioning of the two glass plates with respect to a second predetermined direction,
   wherein each of said pushing portions comprises larger and smaller disc members which are concentrically connected, said larger disc member having a peripheral edge surface that is engageable with the edge of said smaller glass plate and, said smaller disc member having a peripheral edge surface that is engageable with the edge of said larger glass plate.

* * * * *